United States Patent [19]

Newkirk et al.

[11] 4,303,767
[45] Dec. 1, 1981

[54] FLAME RETARDANT ANTISTATIC ADDITIVES AND ANTISTATIC FIBERS

[75] Inventors: David D. Newkirk, Southgate; Robert B. Login, Woodhaven; Basil Thir, Wyandotte, all of Mich.

[73] Assignee: BASF Wyandotte Corporation, Wyandotte, Mich.

[21] Appl. No.: 94,033

[22] Filed: Nov. 13, 1979

Related U.S. Application Data

[62] Division of Ser. No. 746,723, Dec. 2, 1976, Pat. No. 4,229,554.

[51] Int. Cl.$^3$ ............................................. C08L 67/00
[52] U.S. Cl. .................................... 525/444; 525/132; 525/165; 525/167; 525/432; 525/437; 525/438; 525/440
[58] Field of Search ................ 525/444, 438, 432, 437

[56] References Cited

U.S. PATENT DOCUMENTS

4,029,694  6/1977  Weipert et al. ..................... 525/444

*Primary Examiner*—J. Ziegler
*Attorney, Agent, or Firm*—Andrew E. Pierce

[57] ABSTRACT

Flame-retardant antistatic polymer additives are provided which inhibit the buildup of electrostatic charges upon the addition of such compositions to synthetic polymeric fibers, i.e., polyamide fibers, and at the same time do not contribute to the flammability characteristics of such polymeric fibers. The flame-retardant antistatic polymer compositions are useful in combinations with fibers such as polyamide, polyester, polyurea, polyurethane, polysulfonamide, polyolefin and polyacrylic fibers. The antistatic effect is obtained by the process of coating the fibers or dispersing in or on the fibers up to about 12 percent by weight of a polymer composition which is the reaction product of:

(a) a polyoxyalkylene compound or polyester thereof and
(b) at least one reactant selected from the group consisting of (1) a diol, (2) a polyester and (3) an aliphatic or aromatic diacid or derivative of (3), wherein at least one said reactant is halogenated.

Improved flame-retardant properties can be obtained by including with the flame-retardant, antistatic polymer composition an effective flame retardant proportion of a compound from group Vb of the periodic table. Generally about 1:4 to about 4:2 parts halogen to antimony compound is used. Such compounds are oxides of metals such as phosphorus, arsenic, antimony, or bismuth with the preferred compound being antimony trioxide.

11 Claims, No Drawings

FLAME RETARDANT ANTISTATIC ADDITIVES AND ANTISTATIC FIBERS

This is a division of application Ser. No. 746,723, filed Dec. 2, 1976, U.S. Pat. No. 4,229,554.

BACKGROUND OF THE INVENTION

1. Field of the Invention

The invention relates to antistatic additives for textile fibers, particularly for polyamide fibers, which have reduced flammability as compared to prior art antistatic additives.

2. Description of the Prior Art

It is known to obtain decreased buildup of static electricity charge induced by friction on the surface of synthetic textile materials by the incorporation of antistatic additives at the melt-spinning stage of synthetic fiber production. Water-soluble antistatic additives are disclosed in U.S. Pat. No. 3,475,898 which are the poly(alkylene ether) type polymer. Nylon fibers are improved by the incorporation of said water-soluble polymers which, upon the scouring of textile fabrics made using the modified polyamide fibers so treated, are at least partially removed so as to leave voids in the polyamide polymer which remain where the polyether has been removed.

Antistatic polyamide fibers have also been disclosed in U.S. Pat. No. 3,657,386 and U.S. Pat. No. 3,794,631 in which the antistatic additive is based upon a high molecular weight propylene oxide ethylene oxide copolymer based upon ethylenediamine, either alone or containing as an additional component a fatty acid salt.

Both of the above types of antistatic additives have the disadvantage of being more highly flammable than the polyamide fiber itself and, therefore, the incorporation of such antistatic additives increases the flammability of a nylon fiber. Such undesirable increases in flammability of such antistatic polyamide fibers have been a disadvantage which threatens the continued use of such antistatic additives. It is therefore an object of this invention to provide an antistatic additive which does not contribute to the flammability of a polyamide fiber and, therefore, can be used in a sufficient amount to provide maximum antistatic properties without, at the same time, conferring upon the polyamide fiber increased flammability.

The invention has particular application in the manufacture of a carpet, the face of which is made from fibrous textile material which in use normally tends to accumulate a charge of static electricity.

It is known to impart flame retardancy to a synthetic material by incorporating a flame-retarding agent whereby the flame-retarding agent is made an integral part of the chemical structure of the synthetic material. In U.S. Pat. No. 3,883,611 there is disclosed the use of dibromopentaerythritol incorporated into the chemical structure of a polyester to impart flame retardancy. A block copolyester of poly(ethylene terephthalate/tetramethylene dibromoterephthalate) is disclosed as a means of providing flame retardancy to poly(ethylene terephthalate) which overcomes the undesirable thermally unstable characteristics of such compounds as dibromopentaerythritol.

Recently, a polyester prepolymer of a brominated diol has been disclosed which is prepared by the ethoxylation of 4,4'-isopropylidine(2,6-dibromophenol), commonly referred to as tetrabromobisphenol A. Such prepolymers are disclosed in U.S. Pat. No. 3,794,617 and are said to be particularly useful reactive intermediates for the preparation of fiber-forming copolyesters since the prepolymers of the brominated diol have excellent heat stability and thus show little or no discoloration upon exposure to the high temperatures utilized in the preparation and melt-spinning of polyester fibers. In U.S. Pat. No. 3,909,482 there is also disclosed a process for the production of flame-retardant polyester filaments based upon similar halogenated compounds.

The simplest means of incorporating a flame-retardant chemical to provide resistance to burning has been by a surface treatment of the dyed fabric with one or more flame-retardant additives. Surface treatment of the fabric usually has only a temporary effect and the flame-retardant additive is rapidly lost when the fabric is laundered or drycleaned. As discussed above, relatively permanent flame-retardant effects have been obtained by copolymerizing the halogenated flame-retardant monomers of U.S. Pat. No. 3,883,611 into the polymer structure to obtain reduced burning characteristics or physically mixing such halogenated additives into the polymer. The physical mixtures often detract from the physical properties of the base polymer so that while the flame-retardant effect may be relatively permanent, the fibers may be more brittle or have lower tensile strength or less resistance to oxidative degradation or show reduced color stability.

Halogenated additives which have been incorporated into polymeric materials to render them flame-retardant can include either chlorinated or brominated compounds. It is recognized that brominated compounds are often more effective flame retardants than the corresponding chlorinated materials and that synergistic improvements can be obtained by admixture therewith of certain compounds such as antimony oxide. However, brominated materials have often been limited to applications not involving the use of high temperatures since brominated materials tend to decompose and impart undesirable discoloration to the compositions to which they have been incorporated. With many known brominated compounds having hydroxyl or carboxyl groups the objectionable discoloration is so pronounced at polymerization temperatures that the physical properties of the polymer are adversely affected. Such considerations are important in a flame-retardant antistatic additive which is to be incorporated, for instance, into the polyamide fiber by admixture into the polyamide melt prior to the spinning operation.

SUMMARY OF THE INVENTION

The applicants have discovered a new flame-retardant polymeric antistatic additive for synthetic polymeric fibers which is useful both (1) as a polymer composition which can be incorporated in the amount of about 1 percent to about 12 percent by weight of the fibers into the polymer melt prior to spinning of the fiber, or (2) as a surface coating for application to a polyamide, polyester, polyolefin, polyurea, polyurethane, polysulfonamide or polyacrylic fiber subsequent to the weaving and dyeing operation. When the flame-retardant antistatic additive is used as a coating on the surface of the fiber subsequent to the weaving and dyeing operation, it has been found to provide a lubricating or softening effect which promotes a more desirable "hand" to the woven material without contributing to the flammability of the fiber.

The compositions of the invention which provide antistatic properties without the additional tendency toward flammability in the polyamide fiber (which is characteristic of the antistatic additives of the prior art) comprise the reaction product of:
(a) a polyoxyalkylene compound or polyester thereof and
(b) at least one reactant selected from the group consisting of (1) a diol, (2) a polyester and (3) an aliphatic or aromatic diacid or derivative of (3), wherein at least one reactant is halogenated.

The polyoxyalkylene compound can consist of monomeric units, which are the same or different, and where different units can be obtained by block polymerization or from heteric or random polymerization.

The flame-retardant antistatic polymer of the invention can be used either alone or in combination with an effective flame-retardant proportion of a metallic oxide of a metal from group Vb of the periodic table, i.e., phosphorus, arsenic, antimony, or bismuth. The preferred embodiment is antimony trioxide.

Where the flame-retardant antistatic additive of the invention is applied as a coating to the polyamide fibers of a dyed and woven textile fabric, any inert solvent having the capacity to dissolve or disperse an effective amount of the polymer compound of the invention can be used as a means of providing an even distribution of the polymeric compound on the surface of the fiber. A mixture of water and isopropanol containing a small amount of surfactant is preferred for this use. A solvent such as an aliphatic or aromatic hydrocarbon or the chlorinated derivatives thereof can also be used.

DETAILED DESCRIPTION OF THE INVENTION

Suitable antistatic properties can be imparted to a shaped article such as a synthetic polymer filament, yarn or the like, i.e., a synthetic linear fiber-forming polyamide, by incorporation of about 1 percent to about 12 percent of the flame-retardant polymer additive of the invention into the melt prior to melt-spinning fibers from synthetic polymer. Permanent antistatic effects are thus obtained without the concomitant increase in susceptibility to flammability that is characteristic of the antistatic additives of the prior art. Where about 0.1 percent to about 12 percent additive of the invention is coated onto the fibers of a synthetic polymer, preferably about 2 percent to about 6 percent a softening as well as an antistatic effect is obtained. The polyamides are well known in the art and are in general formed by heating an aqueous solution of the salt of a diamine and a dicarboxylic acid or by polymerization of a lactam. Representative polyamides include polyhexamethylene adipamide, polyhexamethylene sebacamide, polyhexamethylene terephthalamide and polycaprolactam.

THE CONJUGATED POLYOXYALKYLENE COMPOUND

As a component of the polymeric flame-retardant antistatic additive of the invention, there is used a conjugated polyoxyalkylene compound, or polyester thereof, said compound consisting of oxypropylene and oxyethylene groups and having as a nucleus, a nitrogen containing reactive hydrogen-containing compound having up to 6 carbon atoms per molecule and selected from the group consisting of ammonia, primary alkyl amines, alkylene polyamines, alkanolamines and heterocyclic nitrogen compounds. Useful primary alkyl amines having not over 6 carbon atoms are methylamine, ethylamine, propylamine, butylamine, amylamine, aniline and hexylamine. Useful alkylene polyamines include ethylenediamine, diethylenetriamine, triethylenetetramine, tetraethylenepentamine, hexamethylenediamine, phenylenediamine and the like. Alkanolamines having not over 6 carbon atoms can be used such as monoethanolamine, diethanolamine, triethanolamine, isopropanolamine, tri(2-propanol)amine, 2-amino-1-butanol, N-butyl-di(2-propanol)amine and the like. Furthermore, heterocyclic nitrogen compounds containing a hetero N atom can be employed, such as piperazine, 2-methylpiperazine, 2,5-dimethylpiperazine, imidazimidazole, pyrazolidine, pyrazolidone, hydantoin, dimethylhydantoin and the like. Hydroxylamine and the hydroxylamine derivatives and aminophenol and aminophenol derivatives can also be used.

The conjugated polyoxyalkylene compounds can be block polymers, i.e., either all of the oxypropylene groups or all of the oxyethylene groups present are attached to the reactive hydrogen-containing nucleus compound at the sites of the reactive hydrogen atoms, with the alternate groups (either oxyethylene or oxypropylene), being present on the chain attached to the ends of the oxyethylene or oxypropylene chains previously described as attached to the nucleus compound at the sites of the reactive hydrogen. Heteric polymers containing random groupings of oxyethylene and oxypropylene can also comprise the conjugated polyoxyalkylene compound. The average molecular weight of the oxypropylene chains can be at least about 900 to about 25,000 and the oxyethylene groups can be in an amount so as to constitute from 20 to 90 weight percent of the mixture in the compound.

The preferred conjugated polyoxyalkylene compound is based upon ethylenediamine as the nucleus nitrogen containing reactive hydrogen compound. Where a polyester of said polyoxyalkylene compound is used, this is the reaction product of said compound with an aromatic, aliphatic dicarboxylic acid or corresponding acid anhydride, ester or acid halide. The conjugated polyoxyalkylene compounds are known as antistatic additives for polyamine compositions, particularly for filaments or yarns prepared by melt-spinning a combination of the antistatic additive and the linear film-forming polyamide. Such conjugated polyoxyalkylene compounds, known as tetrol compounds, are commercially available.

Useful polyester reactants of said tetrol compounds can be prepared by reacting with said tetrol a substantially equivalent amount of an aliphatic or aromatic diacid, acid anhydride or other derivative thereof in a conventional esterification reaction. The diacid, anhydride or other derivative thereof can be halogenated or non-halogenated.

REACTANTS FOR PRODUCING THE ANTISTATIC POLYMER ADDITIVE

The flame-retardant antistatic polymer additives of the invention are derived from the reaction of a conjugated polyoxyalkylene compound, i.e., a tetrol, or polyester thereof with at least one reactant as previously defined above. Said reactant can be a halogenated diol.

1. Diols

Examples of useful halogenated diols are as follows: alkoxylated tetrabromobisphenol A, alkoxylated tetrabromohydroquinone, alkoxylated tetrabromoresorcinol, 3-pentachlorophenoxy-1,2-propanediol, alkoxylated tetrachlorobisphenol A, alkoxylated tetrachlorohydroquinone, alkoxylated tetrachlororesorcinol, 2,2-bis(bromomethyl)-1,3-propanediol, alkoxylated octachloro-4,4'-bis-hydroxybiphenyl, alkoxylated octachloro-4,4'-bis-aminobisphenyl, and 2,2-bis(chloromethyl)-1,3-propanediol.

Preferred brominated diols are those obtained by alkoxylation of a diol, such as brominated bisphenol A, with an alkylene oxide. Especially useful brominated diols are obtained by reaction of a brominated diol with ethylene oxide, propylene oxide and mixtures thereof. Preferably, the bromine is substituted in the positions ortho to the site of alkoxylation, i.e., in the 2- and 6-ring positions of a compound such as tetrabromobisphenol A.

The brominated diols are prepared using known reaction techniques. For example, 2,2-bis[3,5-dibromo-4-(2-hydroxyethoxy)phenyl] propane is obtained by the ethoxylation of 4,4'-isopropylidene-(2,6-dibromophenol), commonly referred to as tetrabromobisphenol A. The tetrabromobisphenol A (melting point 181°–182° C.) can be prepared by the direct bromination of bisphenol A or obtained commercially. The alkoxylation procedure generally consists of reacting the phenolic compound with the appropriate amount of alkylene oxide in the presence of a basic catalyst. The reaction can be conducted with or without a solvent, however, for the ethoxylation of tetrabromobisphenol A, a solvent is usually preferred. Known basic catalysts such as amines and alkali metal hydroxides can be employed. Triethylenediamine is useful and gives rapid reaction rates. Sodium hydroxide is also used where longer reaction times are not objectionable.

Typically, the tetrabromobisphenol A is dissolved in a hydrocarbon solvent, such as xylene, and charged to the reactor with the catalyst. Catalyst amounts can be varied widely but generally will be present in amounts between about 0.05 percent and 0.2 percent by weight based on the tetrabromobisphenol A. The reaction mixture can be distilled to azeotropically remove any water from the system or water which may have been introduced with the catalyst or is present in the solvent. Suitable proportions are at least 2 moles of ethylene oxide to 1 mole of tetrabromobisphenol A. The mixture is heated to 150° C., vented to 10 psig. and the ethylene oxide carefully fed into the reactor. Higher proportions of ethylene oxide or alternatively propylene oxide may be charged, however, if different alkoxylates are desired. Reaction temperature and pressure are maintained until the reaction is completed. Reaction conditions can be varied depending on the catalyst used and the rate of reaction desired. For example, reaction temperatures can be from about 110° C. to about 170° C. or higher while pressures can be from about 25 psig. up to about 75 psig. or higher. The reaction can be monitored by determining the amount of unreacted phenol in the reaction mixture. This is conveniently accomplished by titrating samples of the reaction mixture with a standardized base solution using phenolphthalein as an indicator. If desired, the reaction mixture can be treated with activated charcoal or the product may be directly recrystallized from solution by cooling to about 20° C. with rapid agitation. The brominated diol crystals are recovered by filtration and after washing with xylene may be used, as such, after air-drying in an oven. Alternatively, the solvent may be removed under vacuum at a temperature above the melting point of the product. Chips or flakes may be obtained by such treatment. The product obtained has a phenolic hydroxyl number of 26. Typical products are in the range of about 2 to about 30 phenolic hydroxyl.

2. Polyesters and Aliphatic and Aromatic Diacids and Derivatives

The flame-retardant polymers of the invention can also be prepared by the reaction of said conjugated polyoxyalkylene compound, i.e., tetrol or polyester thereof with a halogenated aliphatic or aromatic dicarboxylic acid or corresponding acid anhydride, ester or acid halide derivative thereof or a halogenated polyester reactant derived from the reaction of an aliphatic or aromatic diacid, anhydride or other derivative thereof and a diol, wherein either or both (1) the diacid or anhydride or (2) the diol is halogenated. As will be apparent to one skilled in the art, should said polyester of a tetrol be hydroxyl-terminated, said halogenated polyester must be carboxyl-terminated for reaction to occur, or vice versa. Should both polyesters be hydroxyl-terminated, reaction is obtained through a cross-linking agent. For substantially complete cross-linking of polyesters having both carboxylic acid and hydroxyl termination, a diacid is desirable as a cross-linking agent. Such cross-linking agents are selected from the group consisting of halogenated or non-halogenated aliphatic or aromatic diacids, anhydrides, esters or acid halides and mixtures thereof. Examples of useful halogenated diacids or anhydride derivatives thereof are as follows: tetrabromophthalic acid or anhydride, tetrachlorophthalic acid or anhydride, chlorendic anhydride (1,4,5,6,7,7-hexachlorobicyclo-(2.2.1.)-5-heptene-2,3-dicarboxylic anhydride), brominated terephthalic acids such as 2,5-dibromoterephthalic acid, hexachlorooctahydro-5,8-methanonaphthalene-2,3-dicarboxylic acid or anhydride. Examples of useful non-halogenated, aromatic and aliphatic diacids and anhydrides are as follows: phthalic acid and phthalic anhydride, isophthalic acid, terephthalic acid and anhydride, azelaic acid, sebacic acid, adipic acid, maleic acid and anhydride.

Known reaction techniques are employed in preparing these halogenated polyester reactants. As described above, the halogenated diols can be used to prepare the halogenated polyester reactant. Useful non-halogenated diols such as ethylene glycol, propylene glycol, 1,3-propanediol, 1,2-butanediol, 1,4-butanediol, glycerol, and pentaerythritol can also be used where at least one halogenated diacid, anhydride or derivative thereof is used. The polyesterification generally consists of reacting the aliphatic or aromatic diacid or anhydride with a substantially equivalent amount of a diol. The reaction can be conducted with or without a solvent, however, for the esterification of tetrabromophthalic anhydride with ethylene glycol, a solvent is usually not required. Known catalysts such as calcium acetate dihydrate and antimony trioxide can be employed.

The brominated or chlorinated polyester reactants of the invention generally contain about 30 to about 70 weight percent bromine or chlorine, have a hydroxyl value of about 5 to 40 and an acid value of less than 40, preferably less than 20 and generally contain approximately 10 percent of the diol residue.

As will be understood by persons skilled in the art, mixtures of non-halogenated diacids such as azelaic acid can be used to produce the polyester of the invention by combination with halogenated diacids or anhydrides in the esterification reaction with a diol to produce the halogenated polyester reactant of the invention. In addition, diacids or their anhydride derivatives can be reacted with halogenated diols to produce the halogenated polyester reactant of the invention.

The halogenated polyester described above is attached to the chain extended tetrol so as to provide about 5 to about 25 repeating polyester units on the tetrol. A total weight percent of halogen of about 5 percent to about 30 percent of the total weight of the flame-retardant polymeric additive is thus obtained. The polyester groups are present in an amount so as to constitute about 10 to about 60 weight percent of the flame-retardant antistatic polymer additive of the invention.

Examples of useful halogenated diacids, anhydrides, and derivatives thereof are those provided hereinabove. Both halogenated and non-halogenated diacids and anhydrides can be utilized as a means of cross-linking the reaction product of the polyoxyalkylene compound or polyester thereof and the halogenated reactant. As will be apparent to one skilled in the art, the corresponding lower alkyl ($C_2$ to $C_8$) esters and corresponding acid halides of said diacids and anhydrides can also be used.

Examples of useful dicarboxylic acids include the following: oxalic, malonic, dimethylmalonic, succinic, glutaric, adipic, trimethyladipic, pimelic, 2,2-dimethylglutaric, azelaic, sebacic, fumaric, maleic, itaconic, 1,3-cyclopentane dicarboxylic, 1,4-cyclohexane dicarboxylic, phthalic, terephthalic, isophthalic, 2,5-norbornane dicarboxylic, 1,4-naphthalic, diphenic, 4,4'-oxydibenzoic, diglycolic, thiodipropionic, 4,4-sulfonyldibenzoic, and 2,5-naphthalene dicarboxylic acids.

In the examples which follow all temperatures are in degrees centigrade and all proportions are by weight unless otherwise stated. It is to be understood that these examples are intended to be illustrative and are not intended to indicate any restriction in the scope of the invention.

The flammability of the flame-retardant antistatic polymer additives of the invention was evaluated by the following method. A nylon 6 jersey No. 322 (Testfabrics, Incorporated) was treated with an isopropanol solution containing the flame-retardant antistatic polymer of the invention. After treatment, the fabric was conditioned overnight at ambient temperature and humidity conditions to insure that the major amount of solvent had evaporated prior to evaluation. In evaluating the treated fabric for fire retardancy, a sample strip measuring 4 inches wide by slightly longer than 16 inches was attached to a frame held at an angle of 45 degrees and the fabric was ignited using a Bunsen burner. The number of ignitions necessary to insure the total consumption of 16 inches of fabric was recorded.

The surface resistivity of the flame-retardant antistatic polymers of the invention was evaluated using a Keithly apparatus. Surface resistivity measurements generally correlate with the ability of the polymer to retain a static electricity charge. This apparatus was a Model 610C multi-range electrometer, Model 240A regulated power supply with a Model 6105 resistivity adaptor. For the purposes of the test, the humidity was regulated with an automatic relative humidity control system consisting of a Kewannee Dry-Box modified so that the relative humidity within the cabinet could be reproducibly controlled. An indicating hygrometer controller Model 15-3252 was employed in conjunction with a pre-calibrated narrow range, Hygrosensors Model H-103 to activate or deactivate an air pump connected in series with a column containing a desiccant such as calcium sulfate. This equipment was found to reliably control relative humidity between the 10 and 30 percent range which was of interest.

Samples were prepared for evaluation of surface resistivity by pouring a uniform film of molten sample on three small glass plates. These films were then conditioned for a period of between 48 and 72 hours at a relative humidity of 10 percent. The samples were evaluated in triplicate, reconditioned for another 24 hours at 20 percent relative humidity level and again measured and, subsequently, conditioned at 30 percent relative humidity for 24 hours prior to obtaining the last measurements.

The thermal stability of the flame-retardant antistatic polymers of the invention was evaluated using a Du Pont Model 990 thermal analyzer in both air and nitrogen. The gas flow was regulated so as to provide a flow of 50 milliliters per minute and the heating rate was 10° C. per minute.

EXAMPLE 1

A flame-retardant antistatic polymer of the invention was prepared by obtaining a halogen containing substantially hydroxyl-terminated polyester of tetrabromophthalic anhydride and ethylene glycol. This was then chemically reacted with a polyester of a chain extended tetrol based on a diamine by combining said tetrol based polyester with said halogen containing polyester and cross-linking the mixture using dimethyl terephthalate.

Specifically, the flame-retardant antistatic polymer of the invention was prepared by utilizing a four-neck, four-liter, round bottom reaction flask equipped with a stirrer, temperature control well, condenser and nitrogen inlet. Into this flask there was charged 79.5 grams (1.28 moles) of ethylene glycol, 0.9 gram (0.009 mole) of potassium acetate, and 500 grams (1.05 moles) of tetrabromophthalic anhydride. The mixture was refluxed at 180° C. for 15 minutes. More potassium acetate was added (0.9 gram) and reflux continued for 1 hour and 15 minutes. The condenser was then replaced by a distillation head and the mixture heated to 180° C. to 190° C. at atmospheric pressure. After 2 hours, 5 grams (0.08 mole) of ethylene glycol was added and heating continued at atmospheric pressure for 3 hours. The bromine-containing polyester obtained had an acid number of 35.2 and an OH number of 38.8.

Into a one-liter, four-neck, round bottom flask eqipped with a mechanical stirrer, temperature control well, nitrogen inlet and a vacuum distillation head and a condenser there was charged 640 grams of a chain extended tetrol based on a diamine sold under the trademark "TETRONIC ® 1504" having a molecular weight of 12,500 together with 0.53 gram of 85 percent phosphoric acid. The reaction mixture was evacuated to 0.4 millimeter of mercury and stripped for 40 minutes at 160° C. After vacuum was relieved with nitrogen, 8.4 grams of dimethyl terephthalate was added to the reaction mixture which was then evacuated to 0.4 millimeter and stripped at 160° C. for 25 minutes. After this time the sample had a viscosity of 10,300 centipoises (Brookfield at 100° C.). After stripping an additional hour, there was added to the reaction mixture 1.5 grams of dimethyl terephthalate, 1.0 gram of sodium methoxide and 80.0 grams of the halogen-containing polyester prepared above. The mixture was stirred for 10 minutes and vacuum stripping was then carried out at 160° C. at a vacuum of about 1 millimeter of mercury over a period of 90 minutes. There was then added 0.5 gram of an 85 percent phosphoric acid solution. After another 35 minutes of vacuum stripping the resultant flame-retardant antistatic polymer had a viscosity of 24,000 centipoises (Brookfield at 100° C.), an OH number of 9.2, an acid number of 0.54 and a bromine content of 6.9 percent.

EXAMPLES 2-4

The procedure of Example 1 was repeated using a sufficient amount of bromine-containing polyester to produce antistatic polymers of the invention having respectively 4.5, 10 and 14.9 percent bromine.

EXAMPLE 5

In this example there is prepared a flame-retardant antistatic polymer of the invention based upon an alkoxylated tetrabromobisphenol A. By the process of the invention the tetrabromobisphenol A is converted to a chain extended diol. A mixture of this chain extended diol is then chemically combined with a chain extended tetrol based on a diamine by a cross-linking reaction with dimethyl terephthalate to obtain the completed flame-retardant antistatic additive of the invention. The specific steps in the process are as follows:

Into a four-neck, three-liter, round bottom flask equipped with mechanical stirrer, temperature control well, nitrogen inlet and vacuum distillation head and condenser, there was charged 1094 grams of a chain extended tetrol made by first ethoxylating under base catalysis N,N,N',N'-tetrakis(2-hydroxypropyl)ethylenediamine and then propoxylating to give a product with a hydroxyl number of 24–28 containing approximately 45 percent propylene oxide. This mixture was heated to 80° C. and was utilized at this stage in the process merely to provide a reaction medium as an alternative to the use of an organic solvent in which to conduct the reaction. Next, there was added to the flask 1037 grams of an ethoxylated tetrabromobisphenol A product having 3 moles of ethylene oxide per mole of tetrabromobisphenol A. The mixture was then heated to 120° C. and stirring continued for one hour until a homogeneous solution resulted. There was then added to this solution 7.5 grams of sodium methoxide and the mixture stirred and heated for 30 minutes. After vacuum was applied, the temperature was increased to 150° C. and the mixture stripped for 3 hours until a red-brown homogeneous solution resulted.

A one-gallon, steam-heated autoclave was charged with 1600 grams of the red-brown homogeneous solution prepared above. The mixture was purged with nitrogen and pressure was then reduced to less than or equal to 10 millimeters of mercury and the mixture stripped at 115° C. for 15 minutes. The vacuum was then relieved with nitrogen and a pressure of 2 pounds per square inch applied. Propylene oxide was then added over a period of 4 hours for a total of 1000 grams. After an additional 2 hours, the mixture had attained constant pressure and was then cooled to 80° C. and the product discharged. Stripping of the products obtained indicated that 220 grams of propylene oxide had been chemically incorporated into the product.

A one-liter, four-neck, round bottom flask equipped with a mechanical stirrer, temperature control well, nitrogen inlet and a vacuum distillation head and condenser was charged with 468 grams of the above propoxylated product together with 0.90 gram of an 85 percent phosphoric acid solution. A vacuum of one millimeter mercury was applied and the mixture stripped for 45 minutes during which time the temperature was increased from 120° C. to 160° C. The vacuum was then relieved with nitrogen and 5.1 grams of sodium methoxide added. The vacuum was reapplied and stripping continued for 30 minutes. Vacuum was relieved with nitrogen and 17 grams of dimethyl terephthalate was added. The reaction mixture was stirred for 15 minutes and vacuum reapplied. Stripping at a pressure of one millimeter of mercury was continued over a period of 2 hours. Sodium methoxide was added in the amount of 5.1 grams, followed by the addition of 17 grams of dimethyl terephthalate over three subsequent additions with stripping continued between additions. The product obtained had a final viscosity of 24,000 centipoises (Brookfield at 100° C.), an OH number of 37.2 and an alkalinity number of 0.709 and 19 percent bromine.

The product was evaluated for stability at elevated temperature by thermal gravimetric analysis. It was determined using a Mettler Thermoanalyzer that a 1 percent weight total loss occurs at a temperature of 320° C. under conditions of heating at 100-gram sample at 8° C. per minute under a nitrogen atmosphere. Most commercial antistatic additives intended for use as components of an extruded polymer mixture have a degree of heat stability indicated by a 1 percent weight loss in the above test at a temperature of about 300° C. or above.

EXAMPLE 6

A flame-retardant antistatic polymer additive of the invention was prepared by following the procedure of Example 1 except that the substantially hydroxylterminated polyester of ethylene glycol was prepared using chlorendic anhydride (1,4,5,6,7,7-hexachlorobicyclo(2.2.1.)-5-heptene-2,3-dicarboxylic anhydride) in place of the tetrabromophthalic anhydride of Example 1. Said polyester had an acid number of 27 and a hydroxyl number of 84. The resulting flame-retardant antistatic additive had a final viscosity of 27,500 centipoises, an OH number of 15.8, an acid number of 23.2 and 5 percent chlorine.

EXAMPLE 7 (Comparative Example)

A comparative or control example was prepared forming no part of this invention by reacting a chain extended tetrol based on a diamine, sold under the trademark "TETRONIC ® 1504" with dimethyl terephthalate in the ratio of 100 parts TETRONIC 1504 to 1.33 parts dimethyl terephthalate in accordance with the procedure of Example 1 except for final neutralization with 85 percent $H_3PO_4$. The resulting polyester had a final viscosity of 11,000 centipoises, an OH number of 11.9 and an acid number of 0.22.

The flammability of nylon fabrics coated with the flame-retardant antistatic polymer additives of the invention are shown in the tables below. The coated nylon 6 fabric appears less flammable than the coated nylon 66 fabric. The results show generally an ascending order of resistance to burning as the proportion of bromine in the polymer additive is increased where the coating weight is substantially constant.

TABLE I

NYLON 6 FABRIC FLAMMABILITY UPON TREATMENT WITH FLAME RETARDANT ANTISTATIC POLYMER ADDITIVES

| Example No. | Halogen in Additive (%) | Coating Weight (%) | Number of Ignitions for Combustion of 16" of Fabric (Average of 6) |
|---|---|---|---|
| 2 | 4.5 (Br) | 12.7 | 4.2 |
| 1 | 6.9 (Br) | 13.5 | 6.7 |
| 4 | 14.9 (Br) | 13.6 | 8.3 |
| 6 | 5.0 (Cl) | 14.5 | 6.7 |
| 7 (Control) | — | 15.3 | 1.0 |

TABLE II

NYLON 66 FABRIC FLAMMABILITY UPON TREATMENT WITH FLAME RETARDANT ANTISTATIC POLYMER ADDITIVES

| Example No. | Halogen in Additive (%) | Coating Weight (%) | Number of Ignitions of Combustion of 16" of Fabric (Average of 6) |
|---|---|---|---|
| 5 | 19 (Br) | 19.2 | 4.3 |
| 3 | 10 (Br) | 14.2 | 1.2 |
| 6 | 5 (Cl) | 18.1 | 1.5 |
| 7 | — | 15.3 | 1.0 |

The surface resistivity of the flame-retardant antistatic polymers of the invention was evaluated using a Keithly apparatus according to the procedure described above. The results of the evaluation of the various antistatic polymers prepared in Examples 1-6 are shown in Table III. It will be noted that the surface resistivity is generally comparable to that shown in the control sample (Example 7), with the results averaging about 10 at 20 percent relative humidity for the majority of the samples tested.

TABLE III

KEITHLY SURFACE RESISTIVITY ($Log_{10}$) OF FLAME RETARDANT ANTISTATIC POLYMERS

| Example No. | % Halogen in Polymer | Relative Humidity (%) | | |
|---|---|---|---|---|
| | | 10% | 20% | 30% |
| 1 | 4.5 | 9.9 | 9.7 | 9.3 |
| 5 | 19 | 11.7 | 10.9 | 10.1 |
| 6 | 5 | 9.9 | 9.7 | 9.3 |
| 7 (Control) | 0 | 9.9 | 9.8 | 9.6 |
| 5 | 19 | 11.5 | 11.1 | 10.8 |

While this invention has been described with reference to certain specific embodiments, it will be recognized by those skilled in the art that many variations are possible without departing from the scope and spirit of the invention.

The embodiments of the invention in which an exclusive property or privilege is claimed are defined as follows:

1. A flame-retardant antistatic polymer comprising the reaction product of
   (a) a polyester of a polyoxyalkylene compound wherein said polyester is the reaction product of a polyoxyalkylene compound with a reactant selected from the group consisting of an aliphatic or aromatic dicarboxylic acid, corresponding acid anhydride, ester, and acid halide with
   (b) a halogenated polyester.

2. The composition of claim 1 wherein said reactant (b) is a halogenated polyester derived from the reaction of an aromatic diacid or derivative thereof with a diol wherein at least one of (1) the diacid or derivative thereof and (2) the diol is halogenated.

3. The composition of claim 2 wherein said diol reactant (b) is a halogenated diol.

4. The composition of claim 3 wherein said halogenated diol is an alkoxylated brominated bisphenol A.

5. The composition of claim 4 wherein said halogenated diol is the reaction product of tetrabromobisphenol A, propylene oxide and ethylene oxide.

6. The composition of claim 2 wherein said halogenated polyester is the substantially hydroxylterminated polyester of tetrabromophthalic anhydride and ethylene glycol.

7. The composition of claim 2 wherein said halogenated polyester is the substantially hydroxylterminated polyester of ethylene glycol and chlorendic anhydride.

8. The composition of claim 7 wherein said polyester of said polyoxyalkylene compound is cross-linked with said halogenated polyester by reaction with a crosslinking agent selected from the group consisting of an aliphatic or aromatic diacid, anhydride, ester, acid halide and mixtures thereof.

9. The composition of claim 8 wherein said crosslinking agent is dimethyl terephthalate.

10. The composition of claim 1 wherein said polyoxyalkylene compound is a conjugated polyoxyalkylene compound having as a nucleus a nitrogen containing reactive hydrogen compound wherein said nitrogen compound has up to 6 carbon atoms per molecule and is selected from the group consisting of ammonia, primary alkyl amines, alkylene polyamines, alkanolamines, and heterocyclic nitrogen compounds.

11. The composition of claim 10 wherein said conjugated polyoxyalkylene compound is a chain extended tetrol based upon a diamine wherein said alkylene diamine is ethylenediamine.

* * * * *